United States Patent
Weber et al.

(10) Patent No.: US 7,290,384 B2
(45) Date of Patent: Nov. 6, 2007

(54) METHOD FOR PRODUCING CHAIN LINK AND A CORRESPONDING CHAIN LINK OF A CABLE DRAG CHAIN

(75) Inventors: Willibald Weber, Netphen (DE); Herbert Wehler, Neunkirchen (DE)

(73) Assignee: Kabelschleep GmbH, Siegen (DE)

( * ) Notice: Subject to any disclaimer, the term of this patent is extended or adjusted under 35 U.S.C. 154(b) by 274 days.

(21) Appl. No.: 10/474,467

(22) PCT Filed: Apr. 4, 2002

(86) PCT No.: PCT/EP02/04077

§ 371 (c)(1),
(2), (4) Date: Apr. 2, 2004

(87) PCT Pub. No.: WO02/084147

PCT Pub. Date: Oct. 24, 2002

(65) Prior Publication Data
US 2004/0231313 A1   Nov. 25, 2004

(30) Foreign Application Priority Data
Apr. 12, 2001 (DE) ................... 101 18 328

(51) Int. Cl.
*F16G 13/00* (2006.01)
(52) U.S. Cl. .............. 59/78.1; 248/49; 248/51
(58) Field of Classification Search ........... 59/78.1; 249/49, 51
See application file for complete search history.

(56) References Cited

U.S. PATENT DOCUMENTS

| | | | |
|---|---|---|---|
| 3,473,769 A | 10/1969 | James | |
| 4,570,437 A * | 2/1986 | Moritz | 59/78.1 |
| 4,590,961 A * | 5/1986 | Schumann | 59/78.1 |
| 5,220,779 A * | 6/1993 | Tatsuta et al. | 59/78.1 |
| 5,881,548 A * | 3/1999 | Takahashi et al. | 59/78.1 |
| 6,067,788 A * | 5/2000 | Weber | 59/78.1 |
| 6,161,373 A * | 12/2000 | Heidrich et al. | 59/78.1 |
| 6,167,689 B1 * | 1/2001 | Heidrich et al. | 59/78.1 |
| 6,170,072 B1 * | 1/2001 | Moriguchi et al. | 59/78.1 |
| 6,318,063 B1 * | 11/2001 | Komiya et al. | 59/78.1 |
| 6,550,232 B1 * | 4/2003 | Achs et al. | 59/78.1 |
| 6,550,233 B2 * | 4/2003 | Blase | 59/78.1 |

FOREIGN PATENT DOCUMENTS

| | | |
|---|---|---|
| DE | 33 18 565 C2 | 12/1984 |
| DE | 43 13 075 A1 | 3/1994 |
| DE | 197 10 489 A1 | 9/1998 |
| DE | 197 15 170 A1 | 10/1998 |
| DE | 199 41 021 A1 | 3/2001 |
| WO | WO95/28273 | 10/1995 |

* cited by examiner

*Primary Examiner*—David B Jones
(74) *Attorney, Agent, or Firm*—Smith Law Office

(57) ABSTRACT

The invention relates to a method for producing a plastic chain link, which has interspaced plates (10, 11) as well as lower and upper cross-connecting elements (15) that connect said plates, whereby at least one cross-connecting element is connected to one of the plates (10) in an articulated manner. According to the invention, at least one of the plates is firstly produced followed by the production of at least one of the cross-connecting elements while simultaneously forming a joint connection between one of the plates and one of the cross-connecting elements.

11 Claims, 6 Drawing Sheets

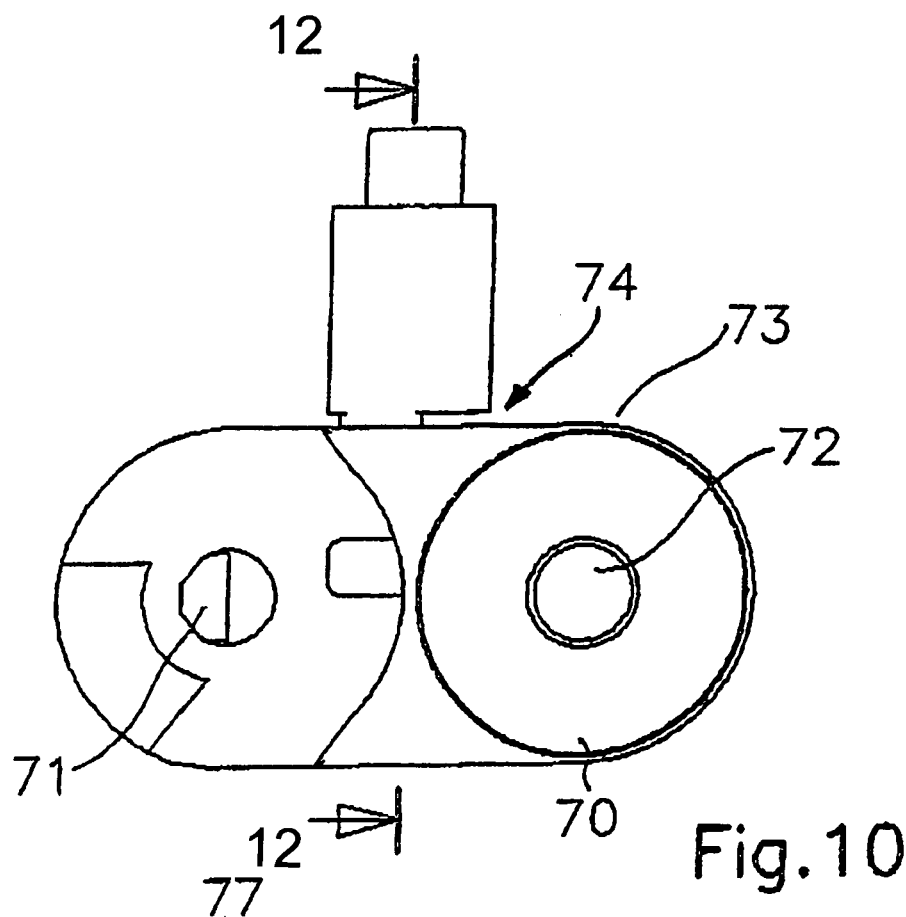
Fig.10
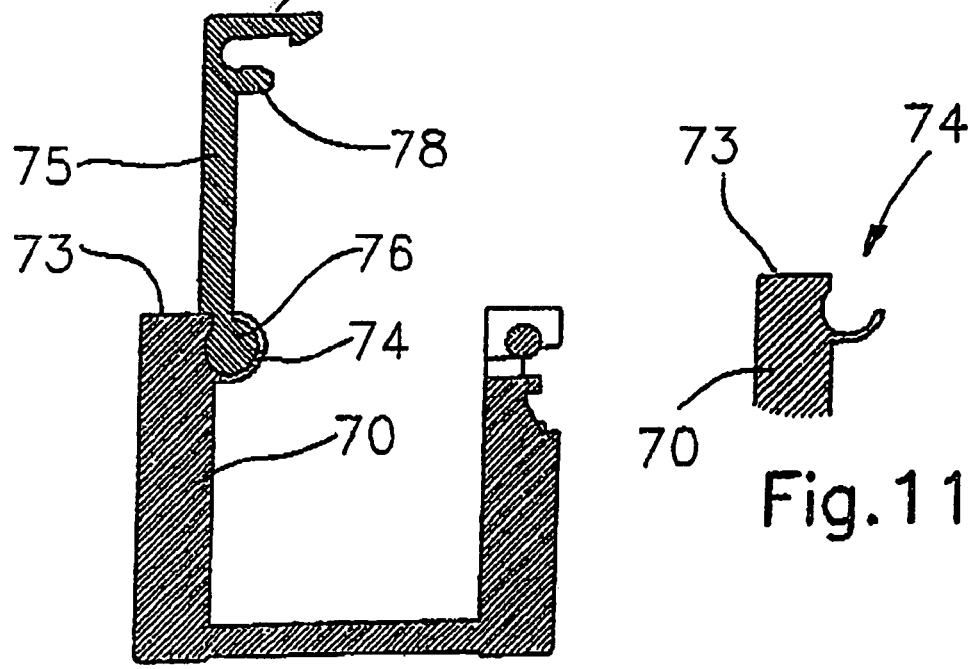
Fig.12
Fig.11

METHOD FOR PRODUCING CHAIN LINK AND A CORRESPONDING CHAIN LINK OF A CABLE DRAG CHAIN

The present invention relates to a method for producing a chain link, and particularly to a chain link for a power transfer chain.

A chain link for a power transfer chain is known from DE 43 13 075 A1, which has two opposite link plates spaced apart from each other. The link plates are connected by a crosspiece. The crosspiece and link plates can be connected by releasable hinges that can be locked together. For this purpose, the crosspiece according to DE 43 13 075 A1 has shoulders on both sides that are connected to pivots with a round cross-section. The link plates have slits to accommodate the shoulders. In the region of the slits, the side plates have recesses for locking the combination and guiding of the pivots. By this configuration of the hinges, pivoting of the crosspiece by 180° is made possible, so that the crosspiece can be brought into any position.

Another variant of a chain link for a power transfer chain is known from DE 33 18 565 C2. The chain link has two opposite link plates at a spacing from each other, which are connected via a closing shackle. The closing shackle is connected to a link plate with a releasable hinge and can be locked to the other link plate with an elastic hook. DE 33 18 565 C2 proposes, for configuration of the hinge, that it consist of an exposed link axis formed in the free edge of a side plate, with a round cross-section flattened perpendicular to the link plate and rounded narrow sides, and of partially circular recesses provided with undercuts, formed in the end of the closing shackle. This closing shackle can be mounted on the axis and pivoted in the direction toward the opposite link plate, and then tightened to the link axis by force-fitting and shape-mating. This type of closing shackle can be pivoted on one side.

A plastic chain link for a power transfer chain is known from WO 95/28273. The chain link is formed by two spaced plates. These are connected by an upper and lower crosspiece. One of the crosspieces is articulated with a plate. This crosspiece is connected to the plate unreleasably. To form the link connection, the individual parts of the chain link are initially prepared. The crosspiece has a link head, from which a first tab and a second fork tab extend in fork-like fashion. The fork-like tabs run essentially parallel to each other on their insides. The link head with the molded-on tabs has a groove that corresponds to the peripheral cross-section of a pin. To form the link connection, the link head is joined to the tabs and pins, by means of an attachment tool with a mating shape. Force on the attachment tool and, optionally under the influence of heat, the tabs are deformed so that their ends are moved toward each other. In this way, enclosure of the pin by the tabs is achieved. The tabs are then deformed relative to each other, so that they come in contact and finally are joined to each other. The pin is fully enclosed by the link head with this connection.

SUMMARY OF THE INVENTION

The present invention provides an easier method for assembling link plates and crosspieces with a fewer number of parts The invention also provides a chain link having at least one crosspiece connected unreleasably to a plate.

The method according to the invention for producing a plastic chain link having spaced plates and lower and upper crosspieces connecting them is characterized by the fact that at least one crosspiece is articulated with one of the plates, during which at least one of the plates is formed, and then at least one of the crosspieces is formed during simultaneous formation of a link connection between one the plates and one of the crosspieces.

The present invention's configuration of the crosspiece does not require the tabs used in WO 95/28273 thereby eliminating additional steps necessary to deform the tabs and form the link connection. The method according to the present invention can be executed with simple tools.

In the present invention, a plate can be formed with a link axis during formation of the crosspiece by a peripheral angle greater than 80°. Plates having a link axis are known per se. The essential design of the plates can therefore be used to implement the assembly procedure according to the present invention. No fundamental change in design of the plate is therefore required in order to execute the method according to the invention. Also, the link axis is preferably formed in a recess.

According to another advantageous embodiment of the present invention that one plate can initially be formed with at least one link mount extending in the longitudinal direction of the plate. This link mount is preferably partially circular in cross-section, so that at least one link pivot can be formed in the link mount during formation of the crosspiece. The materials from which the plates or crosspieces are preferably made are chosen so that they do not prevent pivoting movement relative to each other. This expedient ensures that a pivoting movement of the crosspiece relative to the plate is made possible.

According to another advantageous embodiment of the present invention, it is proposed that the plate have a partially circular link mount in cross-section, whose peripheral angle is greater than 180° and less than 360°. In particular, it is proposed that the peripheral angle be about 270°.

According to another advantageous embodiment of the present invention, it is suggested that the plate have opposite link mounts, in which one link pivot each is formed during formation of the crosspiece.

To reduce the number of parts to be handled for a chain link, according to another advantageous variant of the invention, it is proposed that the plates and one crosspiece be formed as a one-piece, U-shaped part.

To reduce production costs and design expense of a chain link, it is proposed that the plates and/or crosspieces be designed to be substantially the same shape and dimensions.

Production of a chain link preferably occurs by forming at least one crosspiece according to the two-component injection molding method, with simultaneous formation of the link connection between one of the plates and one of the crosspieces. The two-component injection molding method can therefore be conducted in a single machine.

According to another advantageous variant of the present invention, it is proposed that the plates and/or at least one crosspiece be formed at least partially from different plastics. The plates and optionally one crosspiece preferably consist of a plastic chosen from the group of polyamides. To increase the stability of the plates and optionally of the U-shaped part, it is proposed that they be produced from polyamides provided with fiberglass reinforcement.

The plates and optionally the crosspiece can preferably be made from the plastic chosen from the group of polyacetals. The plastic, in particular, is POM here.

According to another aspect of the present invention, a plastic chain link is for a power transfer chain is provided having spaced plates and lower and upper crosspieces connecting them, in which at least one crosspiece is articulated with one of the plates, one section of the crosspiece seamlessly enclosing a link axis formed on the plate. By this expedient, the crosspiece is unreleasably joined to the plate. Owing to the fact that the plate and the crosspiece are seamlessly joined to each other, higher forces can act on the crosspiece without loosening of the crosspiece from the plate. The chain link according to the invention is particularly suited for the formation of a power transfer chain with very small chain links.

According to another advantageous design of a plastic chain link, it is proposed that at least one section of a crosspiece be formed with one of the plates during simultaneous formation of a link connection.

The section of a crosspiece preferably encloses a link axis of the plate over a peripheral angle greater than 180°.

According to another advantageous variant of the chain link, it is preferred that one plate have at least one link mount extending in the longitudinal direction of the plate, into which a link pivot extends, which is formed during formation of the crosspiece.

In particular, it is proposed that the chain link be formed of the plate having two opposite link mounts. A link pivot extends into each of the link mounts, the link pivots being formed during formation of the crosspiece.

The chain link is preferably formed by a crosspiece that is articulated with one of the plates. This plate is connected to the second plate via another crosspiece, in which the plates and the crosspiece form a U-shaped component.

According to another advantageous design of the chain link, it is proposed that at least one crosspiece be formed according to the two-component injection molding method, with simultaneous formation of the link connection between one of the plates and one of the crosspieces.

According to another embodiment of a chain link in accordance with the present invention, it is proposed that the plates and at least one crosspiece be formed at least partially from different plastics. In particular, it is proposed that the plates and optionally one crosspiece be formed from a plastic chosen from the group of polyamides.

According to another embodiment of a chain link in accordance with the present invention, the plates and optionally one crosspiece are formed from a plastic chosen from the group of polyacetals.

Additional details and advantages of the method and the chain link according to the invention are explained with reference to the practical examples depicted in the drawings.

BRIEF DESCRIPTION OF THE DRAWINGS

In the drawings:

FIG. 10 is a side view of another plate of a chain link in accordance with the present invention;

FIG. 11 is a cross-sectional view taken along line 11-11 of FIG. 10; and

FIG. 12 is a partial cross-sectional view of the plate in FIG. 10.

DETAILED DESCRIPTION OF THE PREFERRED EMBODIMENTS

Figure 1:
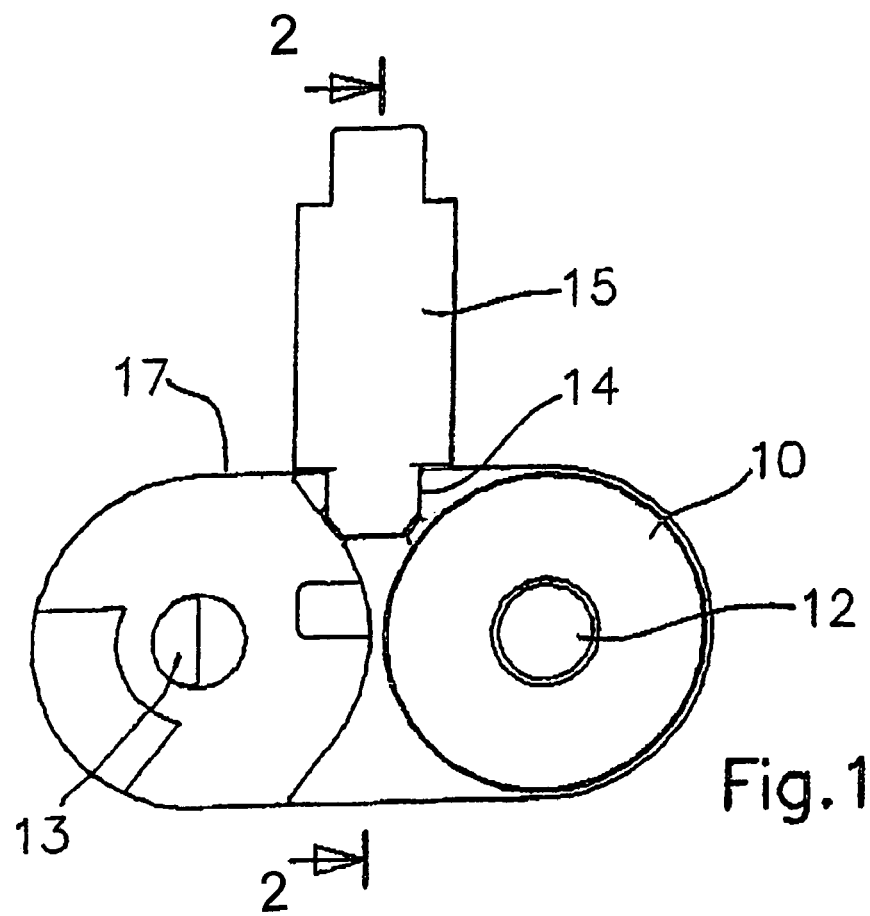
FIG. 1 is a schematic front view of a first example of a chain link in accordance with the present invention.
Figure 2:
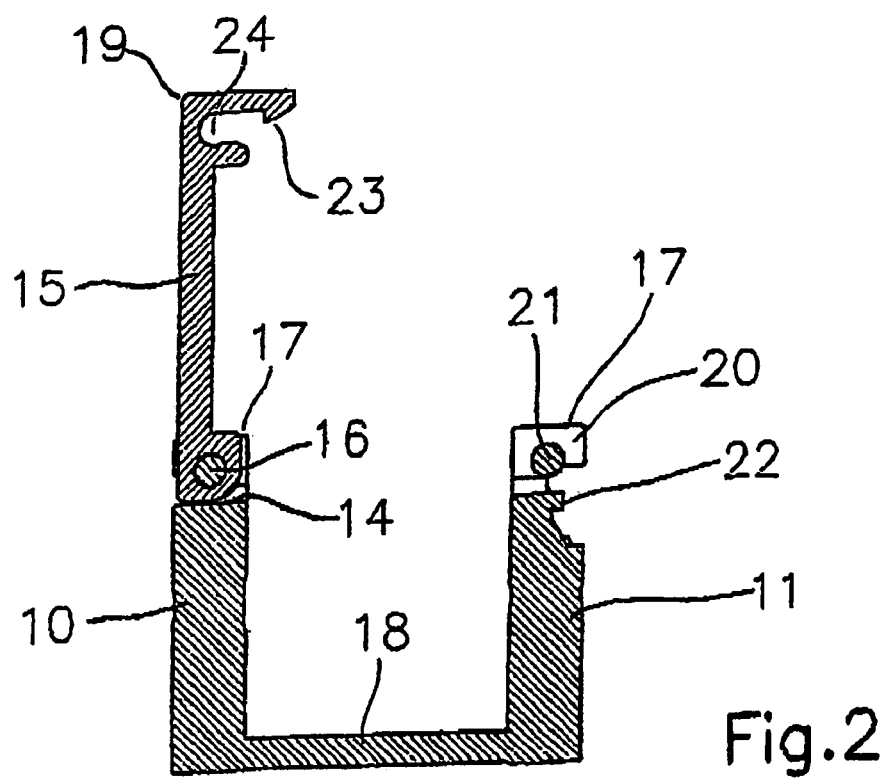
FIG. 2 is a cross-sectional view taken along line 2-2 of FIG. 1.
Figure 3:
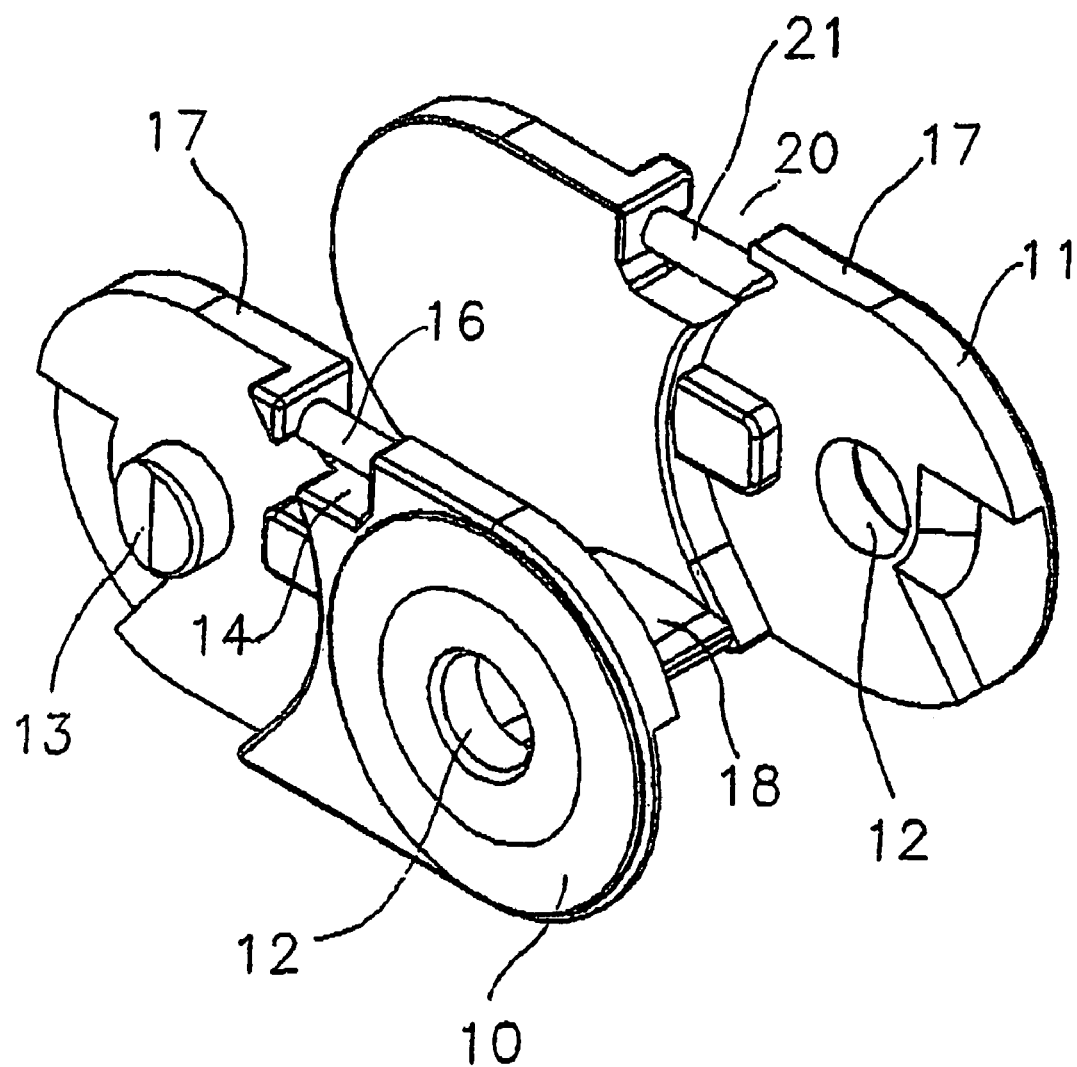
FIG. 3 is a perspective view of a U-shaped chain link part in accordance with the present invention.

FIGS. 1 to 3 illustrate one embodiment of a chain link according to the present invention.

The link is provided for a power transfer chain that can include a number of such chain links. The chain link has two spaced plates 10, 11. In the depicted example, the plates 10, 11 are joined by a lower rigid crosspiece 18. Each plate 10, 11 has a hole 12 on one end region (FIG. 3). A pivot 13 is provided in the opposite end region of the plates 10, 11. For reference in the claims, plate 11 is the "first plate" and the plate 10 is the "second plate." The holes 12 or pivots 13 of the chain plates 10, 11 are shaped and sized so that a pivot 13 can be inserted into the hole 12 of a link plate of an adjacent chain link, and several link plates can be joined together to form a strand. This design of a power transfer chain in known per se.

On an upper edge 17 of the plate 10 and across the longitudinal extent of the plate 10, a recess 14 is provided. A link axis 16 is formed within the recess 14 of plate 10. The link axis 16 has a circular cross-section, as is apparent from FIG. 2.

A crosspiece 15 is articulated with plate 1. FIG. 2 shows that a section of the crosspiece 15 surrounds the link axis 16 seamlessly.

The crosspiece 15 has a hook 19 on its free end. The hook 19 has a hook nose 23, as well as a pin mount 24. For reference in the claims, the first crosspiece is the lower or fixed crosspiece, the second crosspiece is the upper or articulated crosspiece.

An upper longitudinal edge 17 of the plate 11 and across the longitudinal extent of plate 11, a hook mount 20 is provided. The hook mount 20, as is particularly apparent from FIG. 3, has a pin 21 running in the longitudinal direction of the plate 11. A protrusion 22 is provided in the outer wall of plate 11 (FIG. 2).

The crosspiece 15 is pivotable around the link axis 16. In the closed state of the chain link, the pin 21 engages in the pin mount 24 of the hook 19. Beneath the pin 21, the protrusion 22 cooperates with the hook nose 23, so that the crosspiece 15 can be joined releasably to the plate 11. The pin 21, which engages in the closed state in pin mount 24, prevents inadvertent opening of the crosspiece 16, when plates 10, 11 are moved relative to each other.

The chain link depicted in FIGS. 1, 2, and 3 can be produced as follows:

The plates of the chain link are initially formed with plate 10 having a link axis 16. The crosspiece 15 is then formed during simultaneous formation of a link connection between the plate 10 and the crosspiece 15.

The chain link depicted in FIGS. 1 to 3 has a U-shaped chain link part formed from plates 10, 11 and crosspiece 18, but this is not absolutely necessary. The crosspiece 18 can also be releasably joined to plates 10, 11.

There is also the possibility of providing two crosspieces articulated with the plates 10, 11 on one of the two plates. These crosspieces can be connected to the opposite plate.

There is also the possibility of forming the plate 11 with a crosspiece 15 that is articulated with plate 11.

FIGS. 4 to 7 show another practical example of the chain link according to the invention.

The chain link depicted in FIGS. 4 to 7 has a U-shaped chain link part. The chain link has two spaced plates 30, 31. The plates 30, 31 are joined by a lower crosspiece 38.

Each plate 30, 31 has a hole 32 in an end region of the plate. A pivot 33 is formed in the opposite end region. The hole 32 and pivot 33 of a chain link form can be joined to mating holes and pivots on adjacent links to form a power transfer chain.

Figure 4:
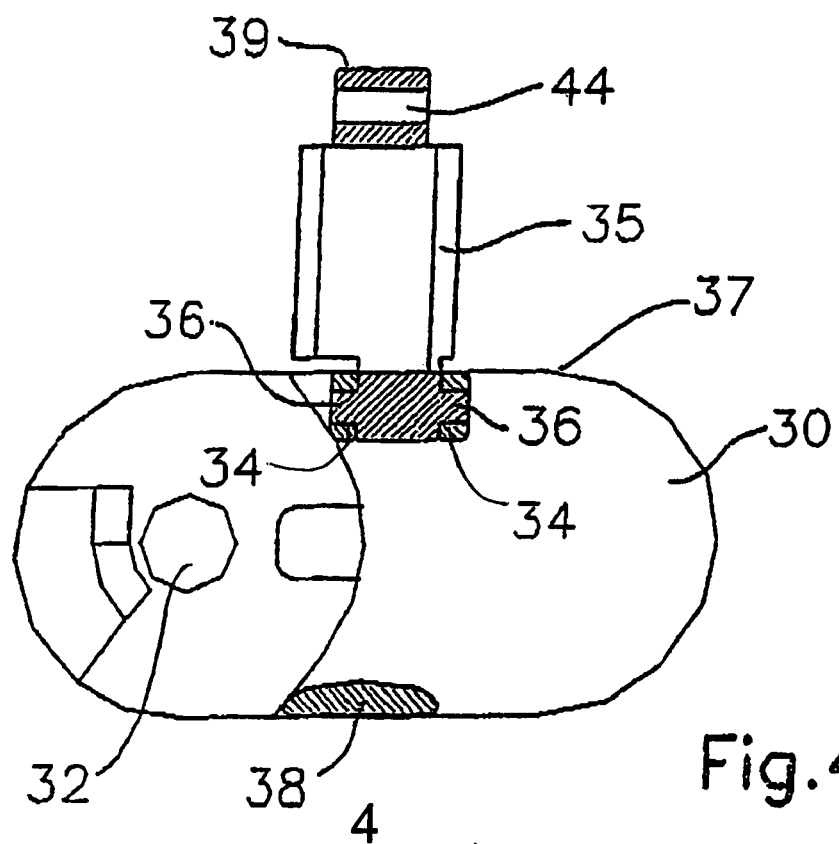
FIG. 4 is a in cross-sectional view of an example of a chain link taken along line 4-4 according to FIG. 5.
Figure 5:
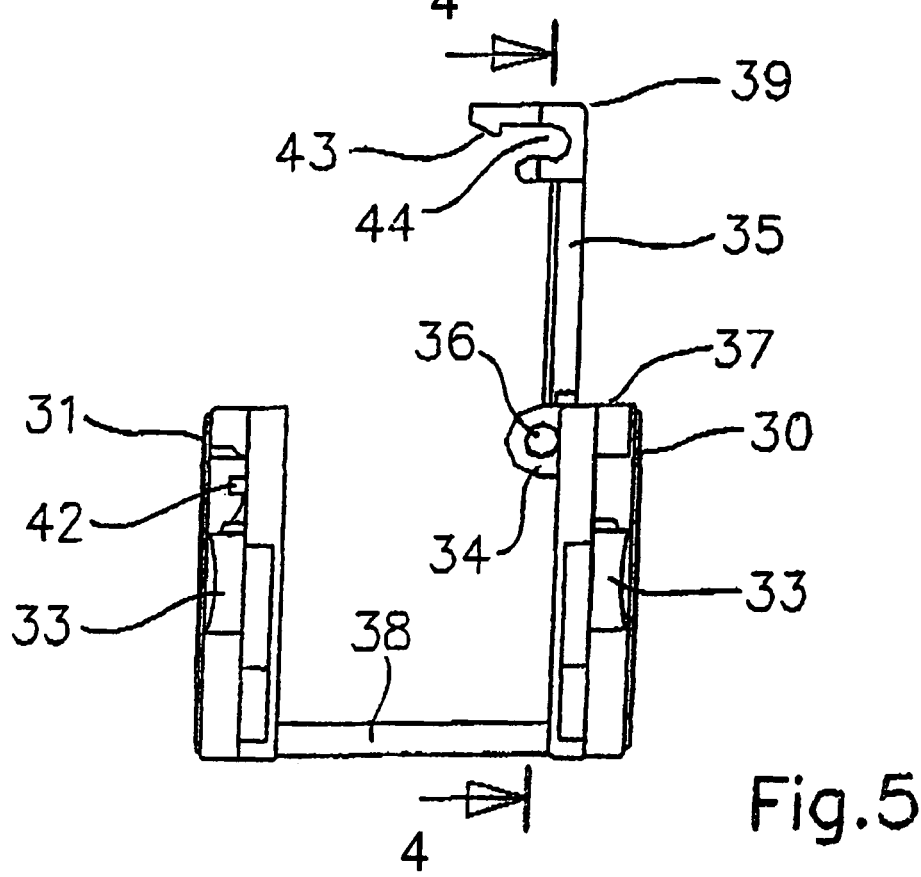
FIG. 5 is a front view of a chain link in accordance with the present invention.
Figure 6:
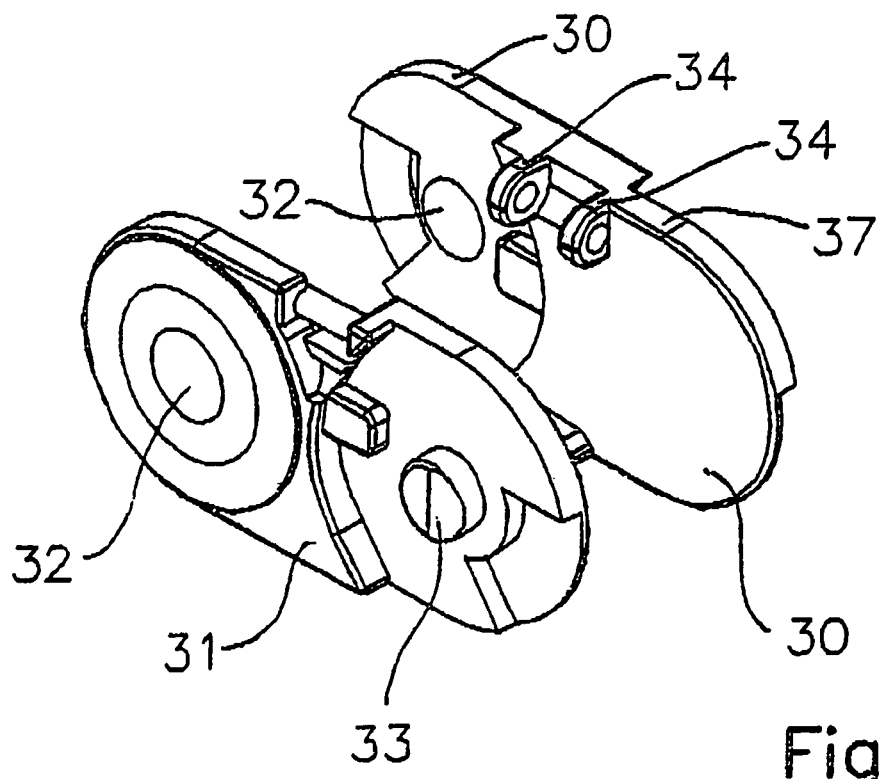
FIG. 6 is a perspective view of a partially constructed U-shaped chain link part of the chain link according to FIG. 5.
Figure 7:
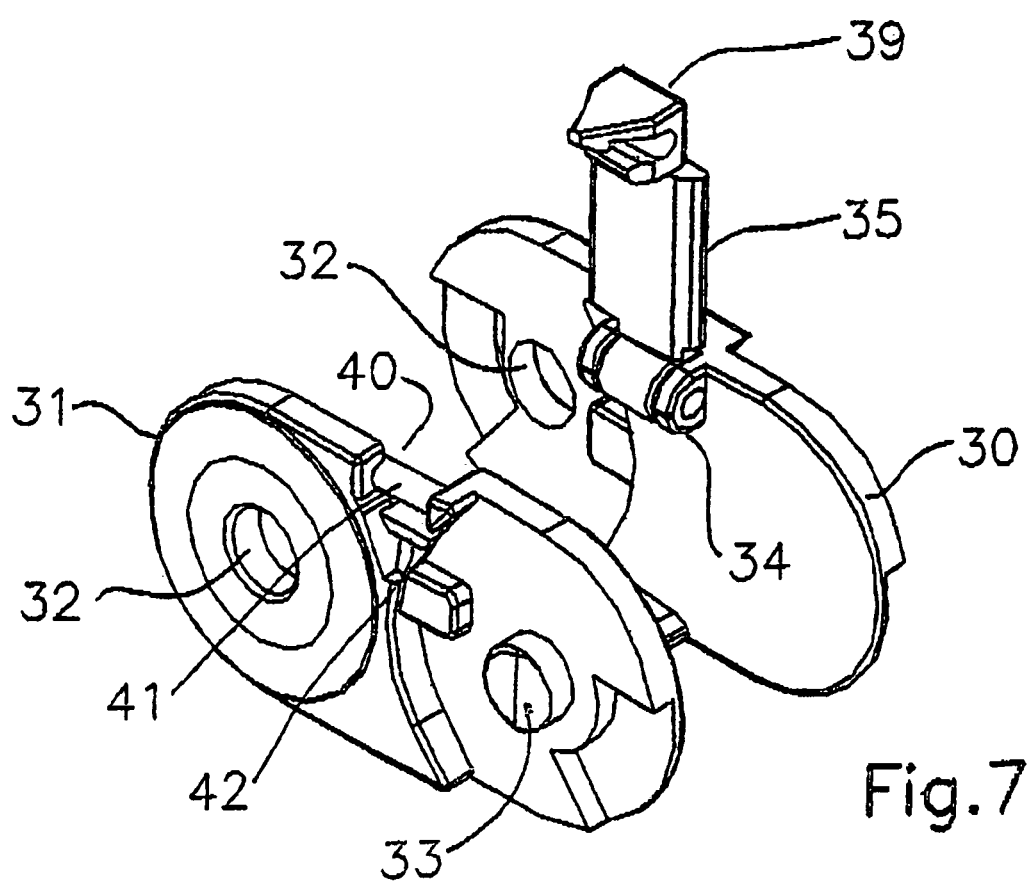
FIG. 7 is a perspective view of a chain link according to FIGS. 5 and 6 and having a crosspiece 35 added.

The chain link in this embodiment has an upper crosspiece 35 articulated with plate 30. For articulation, the plate 30 has link mounts 34. These link mounts 34 are adjacent to an upper edge 37 as depicted, and are formed on the inside surface of plate 30. The two link mounts 34 are spaced apart from each other. FIG. 4 shows that in each link mount 34, a link pivot 36 extends. The link pivots 36 are formed on crosspiece 35. The crosspiece 35 is articulated with plate 30 by the link mount 34 and link pivot 36. FIGS. 4, 5, and 7 show the chain link in the opened state. For closure of the chain link, the crosspiece 35 is pivoted in the direction of the opposite plate 31. The pin 41, formed in a hook mount 40 of the plate 31, enters the pin mount 44 of the hook 39, provided on the free end of the crosspiece 35. During further movement of crosspiece 35 in the direction of plate 31, the hook nose 43 locks behind the protrusion 42 formed on the plate 31, so that the crosspiece 35 is locked to plate 31.

Figure 8:
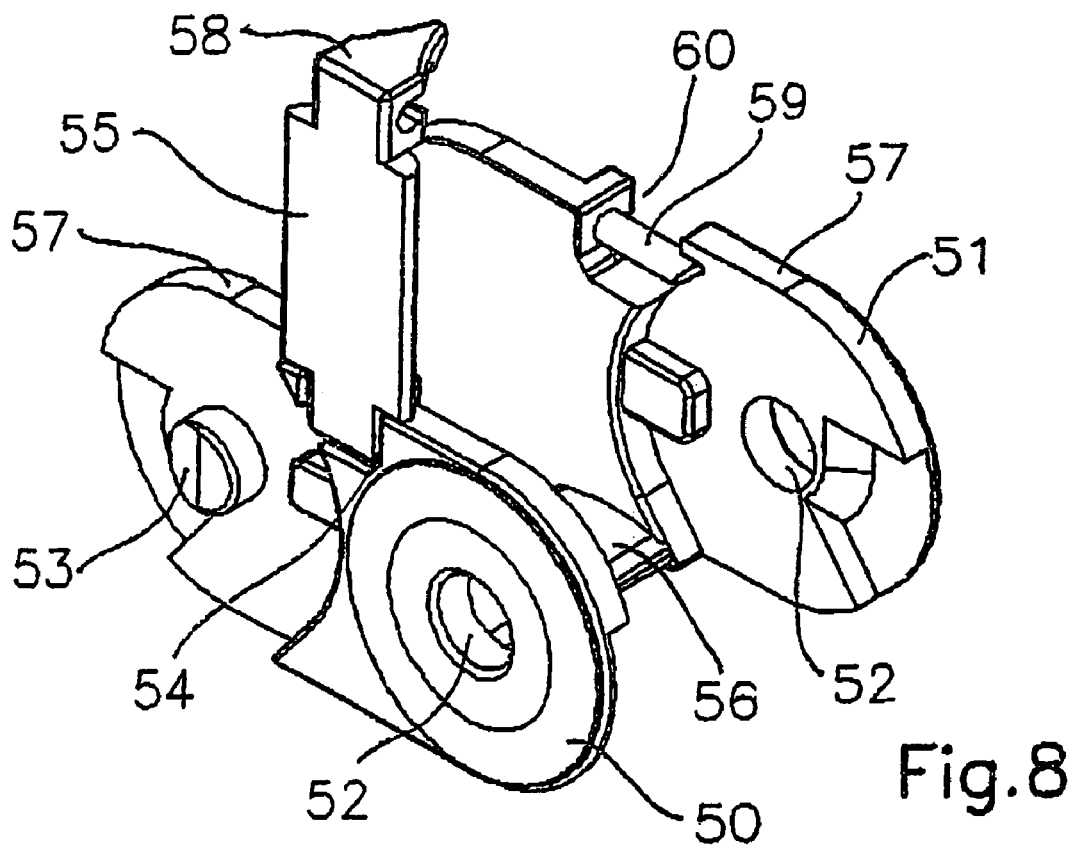
FIG. 8 is a perspective view of the present invention from the reverse side of FIG. 7.
Figure 9:
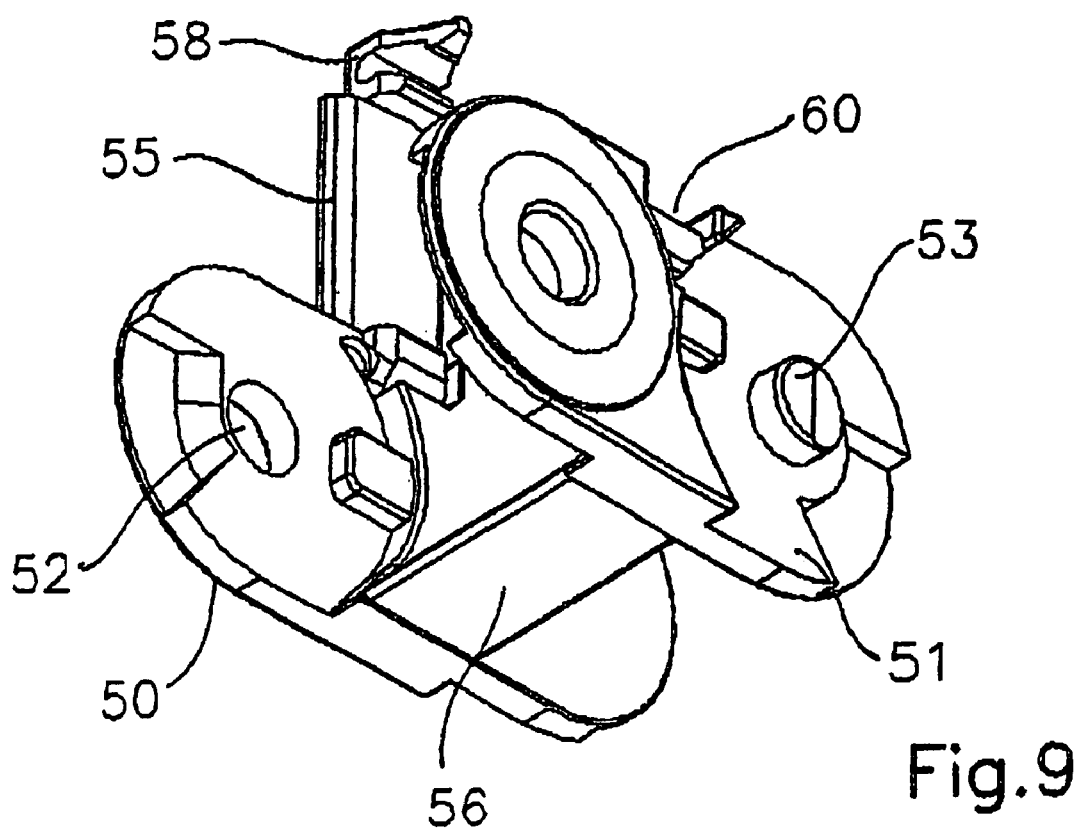
FIG. 9 is a perspective view from the bottom of the chain link according to FIG. 8.

Another practical example of the chain link according to the invention is shown in FIGS. 8 and 9. The essential design of the chain link depicted in FIGS. 8 and 9 corresponds to the chain link shown in FIGS. 4 to 7.

The chain link depicted in FIGS. 8 and 9 has two spaced plates 50, 51. The plates 50, 51 are joined by a crosspiece 56. Each plate 50, 51 has a hole 52 and a pivot 53. The pivots 53 of the plates of an adjacent chain link enter the holes 52 of plates 50, 51. A number of such chain links form a power transfer chain.

The chain link shown in FIGS. 8 and 9 has a plate 51 that has a recess 54 in the upper longitudinal edge 57 as depicted, and in the longitudinal direction, as well as across the longitudinal direction of the plate. Opposite link mounts are formed in the side walls of the recess 54. Link pivots extend into the link mounts, through which the crosspiece 55 is connected to pivot with the plate 51. Formation of the link pivots, which is not shown in FIGS. 8 and 9, occurs during formation of the crosspiece 55.

FIG. 10 shows a plate 70 of the chain link, in which the plate 70 has a hole 72 and a pivot 71. Hole 72 and pivot 71 are formed on the opposite end regions of the plate 70. A link mount 74 is formed in the edge 73 and in the longitudinal direction of the plate, as is particularly apparent from FIG. 11.

The link mount 74 has a partially circular cross-section. FIG. 12 shows that a link pivot 76 is situated in the link mount 74, which had been formed during production of the crosspiece 75. The crosspiece 75 is pivotable by an angle of about 90°. A hook 77 is formed on the end of crosspiece 75 opposite link pivot 76, which can be locked to an opposite link plate. Locking is preferably designed so that it is releasable. To improve rigidity of the crosspiece 75, it can have a rib.

The invention claimed is:

1. A method for the production of a plastic chain link, having first and second spaced plates connected by first and second crosspieces, and an articulated link connection joining the second plate and the second crosspiece, the method comprising the steps of:
    simultaneously forming the second plate, the second crosspiece, and the articulated link connection;
    forming at least one link mount in the second plate, the link mount extending in the longitudinal direction of the plate; and
    forming at least one link pivot on the crosspiece during formation of the second crosspiece, wherein the link pivot mates with the link mount to define the articulated link connection.

2. A method for the production of a plastic chain link, having first and second spaced plates connected by first and second crosspieces, and an articulated link connection joining the second plate and the second crosspiece, the method comprising the steps of:
    simultaneously forming the second plate, the second crosspiece, and the articulated link connection;
    forming opposing link mounts in the plate; and
    forming a link pivot during formation of the second crosspiece, wherein the link pivot mates with the link mount to define the articulated link connection.

3. A method for the production of a plastic chain link, having first and second spaced plates connected by first and second crosspieces, and an articulated link connection joining the second plate and the second crosspiece, the method comprising the steps of:
    simultaneously forming the second plate, the second crosspiece, and the articulated link connection; and
    forming a link mount with a partially circular cross-section in the plate, and having a peripheral angle greater than about 180° and smaller than about 360°.

4. The method according to claim 3, wherein the step of forming the link mount with a partially circular cross-section in the plate, comprises the step of:
    forming the link mount with a peripheral angle of about 270°.

5. A method for the production of a plastic chain link, having first and second spaced plates connected by first and second crosspieces, and an articulated link connection joining the second plate and the second crosspiece, the method comprising the step of:
    simultaneously forming the second plate, the second crosspiece, and the articulated link connection, wherein the step of simultaneously forming the second plate, the second crosspiece, and the articulated link connection comprises the step of:
    incorporating a two-component injection molding method, for simultaneous formation of the articulated link connection between the second plate and the second crosspiece.

6. A method for the production of a plastic chain link, having first and second spaced plates connected by first and second crosspieces and an articulated link connection joining the second plate and the second crosspiece, the method comprising the step of:
    simultaneously forming the second plate the second crosspiece, and the articulated link connection, wherein the step of simultaneously forming the second plate, the second crosspiece, and the articulated link connection comprises the step of:
    forming a portion of the second plate and the second crosspiece with a first plastic and a portion of the second plate and the second crosspiece with a second plastic.

7. The method according to claim 6, wherein the step of forming the second plate, the second crosspiece, and the articulated link connection comprises the steps of:
   forming the articulated link connection with a first plastic and forming a portion of the the articulated link connection with a second plastic.

8. A plastic chain link for a power transfer chain, comprising:
   a first plate;
   a second plate spaced apart from the first plate;
   a first crosspiece connecting the first and second spaced apart plates;
   a second crosspiece; and
   a link connection joining the second plate and the second crosspiece for pivoting movement of the second crosspiece relative to the second plate, the link connection formed integrally with the second plate and the second crosspiece, wherein the second crosspiece is formed simultaneously with the link connection and the second plate, wherein the link connection comprises at least one link mount on the second plate extending in a longitudinal direction of the second plate; and
   a link pivot on the second crosspiece and mated with the link mount.

9. The chain link according to claim 8, wherein the link connection comprises:
   two spaced apart opposite link mounts on the second plate; and a link pivot on the second crosspiece and mated with the link mount.

10. A plastic chain link for a power transfer chain, comprising:
    a first plate;
    a second plate spaced apart from the first plate;
    a first crosspiece connecting the first and second spaced apart plates;
    a second crosspiece; and
    a link connection joining the second plate and the second crosspiece for pivoting movement of the second crosspiece relative to the second plate, the link connection formed integrally with the second plate and the second crosspiece, wherein the second crosspiece is formed according to a two-component injection molding method, with simultaneous formation of the link connection and the second plate.

11. A plastic chain link for a power transfer chain, comprising:
    a first plate;
    a second plate spaced apart from the first plate;
    a first crosspiece connecting the first and second spaced apart plates;
    a second crosspiece; and
    a link connection joining the second plate and the second crosspiece for pivoting movement of the second crosspiece relative to the second plate, the link connection formed integrally with the second plate and the second crosspiece, wherein the first and second plates and the first crosspiece are formed at least partially from different plastics.

* * * * *

UNITED STATES PATENT AND TRADEMARK OFFICE
CERTIFICATE OF CORRECTION

PATENT NO. : 7,290,384 B2  Page 1 of 1
APPLICATION NO. : 10/474467
DATED : November 6, 2007
INVENTOR(S) : Weber et al.

It is certified that error appears in the above-identified patent and that said Letters Patent is hereby corrected as shown below:

On Title Page Item 73
Assignee: "Kabelschleep" should be --Kabelschlepp--

Signed and Sealed this

Eleventh Day of March, 2008

JON W. DUDAS
*Director of the United States Patent and Trademark Office*